(12) United States Patent
Robinson et al.

(10) Patent No.: US 6,333,764 B1
(45) Date of Patent: Dec. 25, 2001

(54) VIDEO SIGNAL LUMINANCE AND CHROMINANCE SEPARATION

(75) Inventors: Roger Neil Robinson, Buckinghamshire; Roy Steinar Sutherland, Berkshire, both of (GB)

(73) Assignee: Vistek Electronics Ltd., Buckinghamshire (GB)

( * ) Notice: Subject to any disclaimer, the term of this patent is extended or adjusted under 35 U.S.C. 154(b) by 0 days.

(21) Appl. No.: 09/171,190

(22) PCT Filed: Feb. 16, 1998

(86) PCT No.: PCT/GB98/00475

§ 371 Date: May 17, 1999

§ 102(e) Date: May 17, 1999

(87) PCT Pub. No.: WO98/36578

PCT Pub. Date: Aug. 20, 1998

(30) Foreign Application Priority Data

Feb. 14, 1997 (GB) .................................................. 9703143

(51) Int. Cl.[7] .................................................. H04N 9/77
(52) U.S. Cl. .......................... 348/663; 348/607; 348/609; 348/665; 348/667
(58) Field of Search .................................. 348/607, 608, 348/609, 663, 664, 665, 667, 668, 638, 571, 450, 669, 712, 713, 642, 644, 645; 382/162, 163, 260; H04N 9/77

(56) References Cited

U.S. PATENT DOCUMENTS

| 4,583,113 | * | 4/1986 | Pritchard | 358/11 |
| 4,864,389 | * | 9/1989 | Faroudja | 358/11 |
| 4,893,176 | * | 1/1990 | Faroudja | 358/31 |
| 4,958,230 | * | 9/1990 | Jonnalagadda | 358/186 |
| 5,424,784 | * | 6/1995 | Raby | 348/668 |
| 5,663,771 | * | 9/1997 | Rabby | 348/663 |
| 5,852,476 | * | 12/1998 | Limberg | 348/725 |
| 5,956,494 | * | 9/1999 | Girardeau | 395/385 |
| 2001/0005235 | * | 6/2001 | Masami | 348/663 |

FOREIGN PATENT DOCUMENTS

| 0 340 098 A1 | 11/1989 | (EP) . |
| 0 362 747 A2 | 4/1990 | (EP) . |
| 2 170 975 A | 8/1986 | (GB) . |
| 61002488 | 1/1986 | (JP) . |

OTHER PUBLICATIONS

H. Owashi et al., "An Integrated Digital Y/C Separator For S–VHS VCR", Proceedings of the Custom Integrated Circuits Conference, San Diego, May 15–18, 1989.

* cited by examiner

*Primary Examiner*—Matthew Luu
*Assistant Examiner*—Wesner Sajous
(74) *Attorney, Agent, or Firm*—Westman, Champlin & Kelly, P.A.

(57) ABSTRACT

A video signal decoder including a comb filter characterised by means for changing the operating mode of the filter progressively. Also, a video signal decoder including a comb filter characterised by means for adjusting continuously the degree of filtering performed by the filter. In one arrangement the decoder comprises an input filter and two signal multipliers wherein one of the multipliers is connected to receive a signal output by the input filter and the other multiplier is connected to receive a signal output by the comb filter wherein operation of the multipliers is mutually interdependent. In another arrangement, the decoder comprises an input filter, a subtraction circuit and a signal multiplier; the multiplier being connected to receive an output from the comb filter and multiply said output by variable factor so as to input a multiplied signal to said subtraction circuit; the subtraction circuit being connected to perform a subtraction between the multiplied signal and a signal output by the input filter, the subtraction circuit having an output which provides a chrominance signal.

14 Claims, 6 Drawing Sheets

VIDEO SIGNAL LUMINANCE AND CHROMINANCE SEPARATION

The invention relates to an improved method and apparatus for separating composite colour video signals into separate luminance and colour components. It applies to colour encoded signals in which the colour information is amplitude modulated on a high frequency subcarrier. Such systems include NTSC and various forms of the PAL system.

Many forms of comb filters have been described which when incorporated in a colour television decoder provide improved separation of the luminance and colour difference components of the signal. Such comb filters incorporating video delays of television lines, fields or frames usually fail to provide adequate separation of the luminance and chrominance components of the signal where the colour information changes from one scanning line to the next or from one field to the next, ie where the picture contains vertical colour detail or motion, or contains scene changes.

Another aspect of decoders incorporating comb filters is that the inclusion of delay lines within the comb filter usually means that the output decoded picture signals are significantly delayed with respect to the input signal. Such delays are very inconvenient in decoders used in the professional studio environment where signals are usually co-timed to enable such operations as video mixing and keying to be performed. Video delays in excess of one field may also cause problems with sound synchronisation.

The present invention provides a high degree of separation of the luminance and chrominance components of the input signal, yet introduces minimal delay in its processing. It is applicable to any device requiring the luminance and colour difference components of a television signal to be separated and can operate with any form of NTSC or PAL encoded signal.

Embodiments of the invention will now be described, by way of example only, with reference to the accompanying diagrammatic figures, in which.

Figure 1:
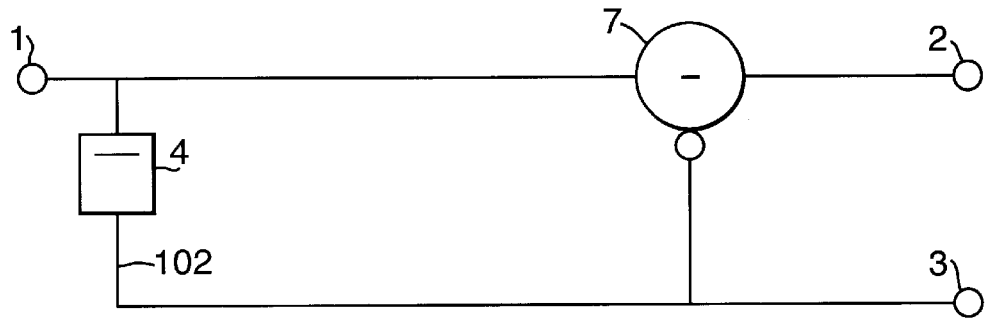
FIG. 1 shows a simple complimentary method of separating the luminance and chrominance components of a television signal using a band-pass filter.

The arrangement illustrated in FIG. 1 provides a simple method of separating the luminance and chrominance components of a colour television signal ensuring no loss of any signal components.

The input television signal 1 is connected to a filter 4 which is arranged to pass signal components at or close to the colour subcarrier frequency of the input signal and to reject low frequency signals. Such filter may have either a band-pass or low-pass characteristic.

The output signal 102 from the filter provides the chrominance output 3 from the separation circuit.

The input signal 1 and the filtered signal 102 are also connected to a subtraction circuit 7 which is arranged to subtract the filtered signal 102 from the input signal. The output from the subtractor provides the separated luminance signal 2.

This simple example illustrates the principle of complimentary separation of luminance and chrominance in which the characteristics of the luminance separation are the exact inverse of the chrominance separation.

Figure 2:
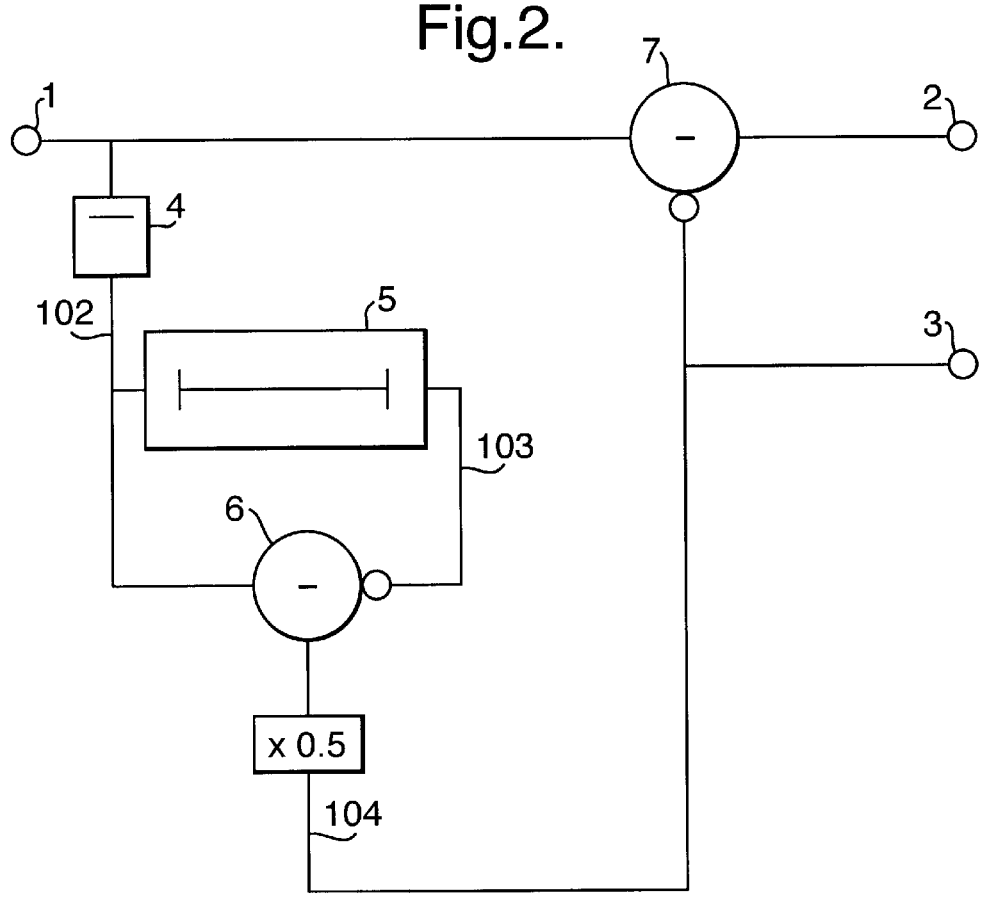
FIG. 2 shows the use of a delay line to provide a comb filter for separation of luminance and chrominance.

The separation of luminance and chrominance components of a television signal may be improved by incorporating a comb filter. Such an improved technique applicable to the NTSC colour television system is shown in FIG. 2. The input television signal 1 is connected to a filter 4 to select frequencies close to the colour subcarrier as in FIG. 1. The output signal 102 from the filter is connected to a delay means 5 which has a delay substantially equal to one television line period.

The output 103 from the delay means 5 is subtracted from the filtered signal 102 and the result multiplied by 0.5 to provide signal 104, this also provides the chrominance output signal 3. This same signal when subtracted from input signal 1 provides luminance output 2.

The operation of the comb filter assumes that whilst the luminance content of the picture will be substantially similar on consecutive lines, the chrominance information will be substantially in anti-phase due to the subcarrier to line frequency relationship of NTSC. Thus luminance energy will cancel in adder 6, whilst chrominance information will add. This principle is commonly used in NTSC television receivers.

The separation of luminance and chrominance will however fail when the picture content changes from one line to the next. In particular a pattern of luminance dots will appear in the displayed luminance output on one line in each field below any line-to-line colour change. This is due to incomplete cancellation of the colour subcarrier in subtractor 6.

The operation of the circuit shown in FIG. 2 can be modified by replacing delay means 5 with a delay of approximately one television field period. For the 525 line NTSC system a delay of exactly 263 lines is appropriate. This modification reduces the visibility of the dot pattern on the luminance output. Following an abrupt line-to-line colour change such patterning will now only be apparent on one line of each 525 line frame. Motion of coloured areas within the picture may however cause incomplete separation of luminance due to differences in chrominance information on different fields.

The configuration incorporating a delay of approximately one television-field can be made to function effectively for 625 line PAL television signals. In this case a delay of exactly 312 television lines is appropriate for delay means 5. The separation of luminance and chrominance will again be incomplete in the presence of line-to-line colour changes or motion of coloured areas within the picture.

The performance of the decoder previously described can be improved if the comb filter is inhibited in particular areas of a television picture. In practice it is found preferable that action of the comb filter can be reduced progressively, thus avoiding any abrupt changes of operating mode.

Figure 3:
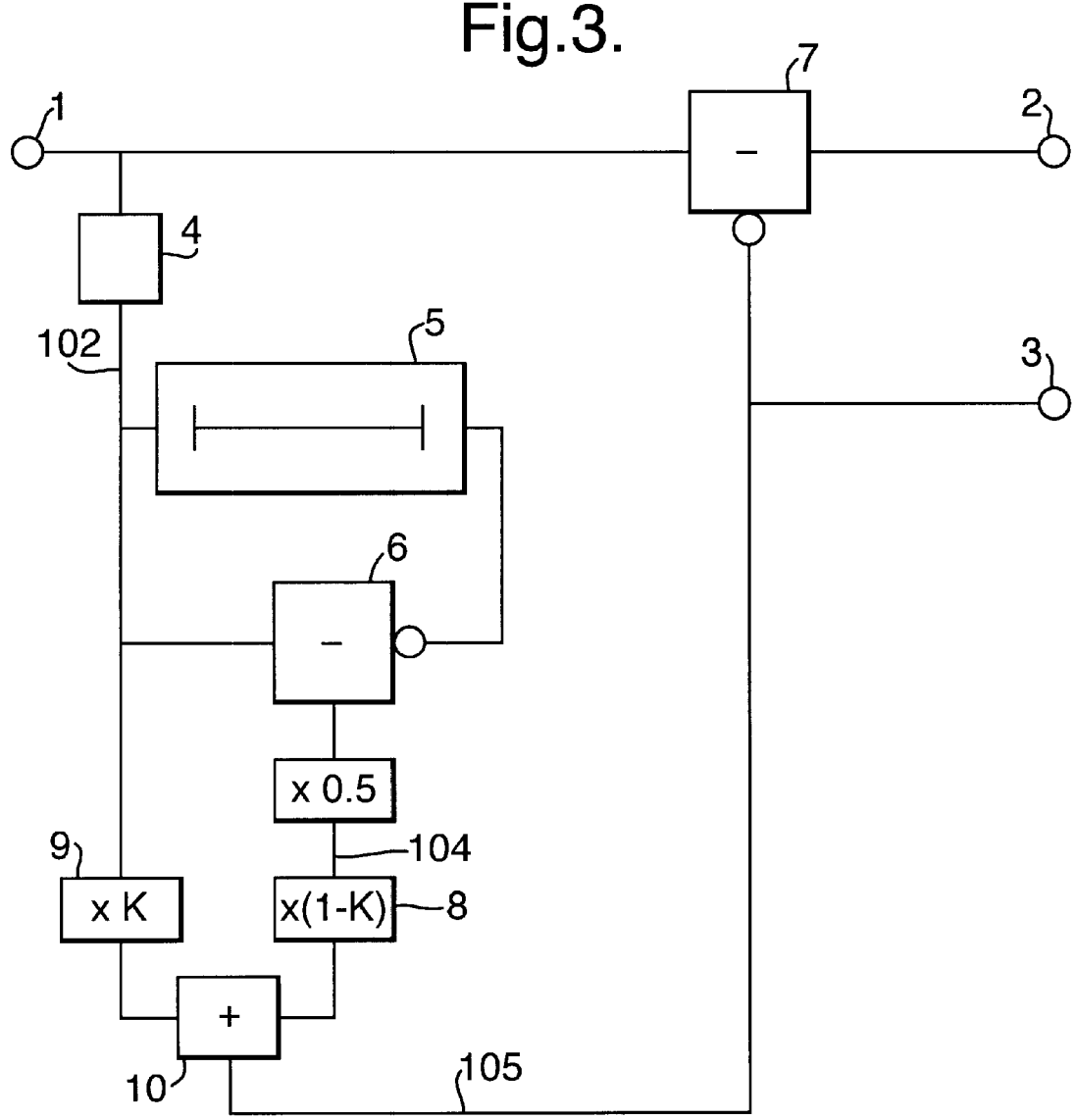
FIG. 3 shows a circuit in which the degree of comb filtering can be varied.

FIG. 3 shows a method by which the degree of comb filtering may be continuously adjusted. In this configuration filter 4 provides a filtered version of the input signal 102 as in FIG. 1. Delay means 5 and subtractor 6 provide an output which when multiplied by 0.5 corresponds to comb filtered signal 104 as previously explained with reference to FIG. 2. Filtered signal 102 and comb filtered signal 104 are each connected to separate multiplying circuits 9 and 8 respectively. In these circuits filtered signal 102 is multiplied by a factor K in multiplier 9, where K is a variable number between zero and one. Comb filtered signal 104 is multiplied by a number numerically equal to (1−K) in multiplier 8.

When the outputs of multipliers 8 and 9 are added in adder 10 the output signal from the adder 105 is a variable mix of the filtered and comb filtered signals, where the ratio of filtered to comb filtered components is determined by the variable K. This new mixed signal may be used to provide the chrominance output 3 and also be subtracted from the input signal 1 to provide the luminance output from the separator. In this way the variable number K determines the degree of comb filtering applied to the separation of luminance and chrominance.

Figure 4:
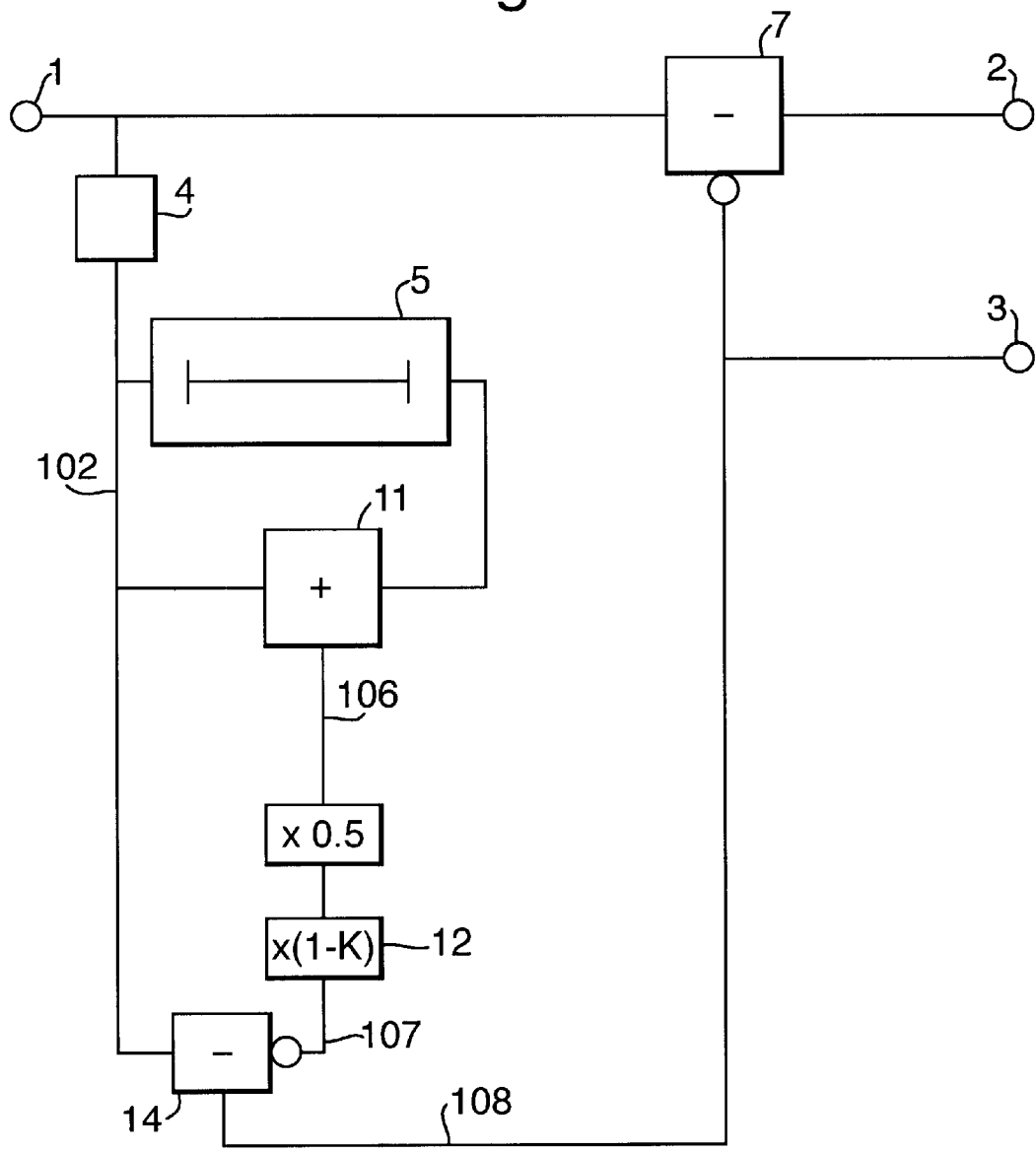
FIG. 4 shows an alternative means of varying the degree of comb filtering.

FIG. 4 shows an alternative arrangement which performs an identical function to that shown in FIG. 3. In this arrangement the operation of filter 4 and delay means 5 are similar to that described with reference to FIG. 3. The filtered signal 102 and the output from delay means 5 are added in adding circuit 11. The resultant output signal 106 is then multiplied by 0.5 then further multiplied by the variable-number numerically equal to (1−K) in multiplication circuit 12. The output 107 of multiplier 12 is then subtracted from filtered signal 102 in subtraction circuit 14 to provide a difference signal 108. This difference signal can be shown to be identical to the output of adder 10 in FIG. 3 and can provide the chrominance output from the separator and produce the luminance output as previously described. This arrangement has the advantage over that shown in FIG. 3 that only one multiplying circuit is required.

Figure 5:
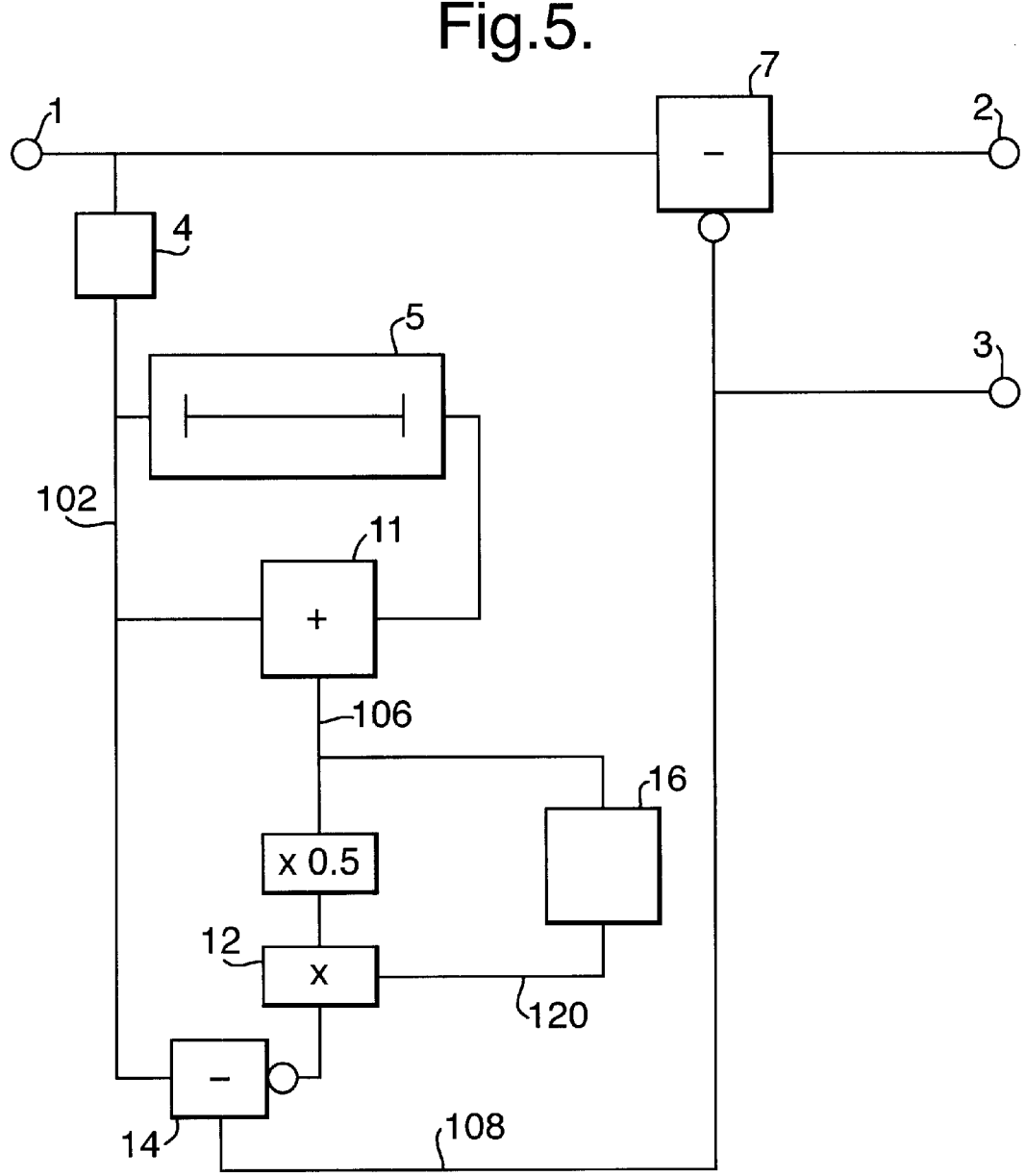
FIG. 5 shows a means by which the degree of comb filtering can be controlled automatically according to picture content.

FIG. 5 shows an arrangement similar to FIG. 4 in which a control means 16 is used to provide a controlling signal 120 to multiplier 12. This control signal is equivalent to the variable number K in FIG. 4. In this example the control signal is shown derived in control means 16 from the output signal 106 of adder 11.

Figure 6:
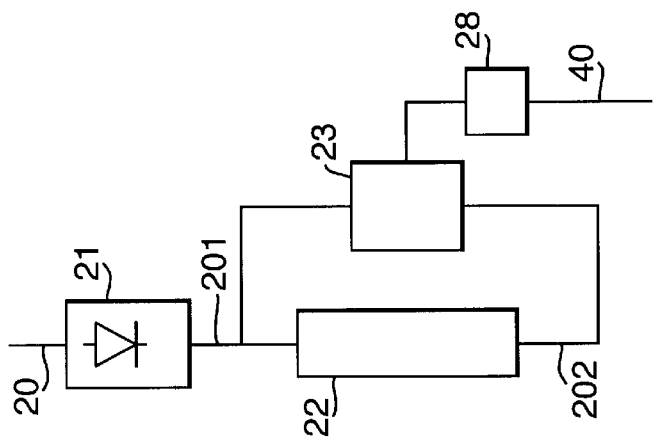
FIG. 6 shows a simple means of providing a control means to vary the degree of comb filtering.

FIG. 6 shows an example of a suitable control means which may be used in the arrangement shown in FIG. 5. The input signal 20 to the control means will be assumed to be equivalent to output signal 106 from adder 11 of FIG. 5.

The input signal 20 is connected to a peak detecting circuit 21 which measures the amplitude of the input signal. The amplitude signal output 201 is connected to a delay means 22 which produces delayed amplitude signal 202. The amplitude signal and the delayed amplitude signal are connected to a comparison circuit 23. When the amplitude signal 201 exceeds the delayed amplitude signal 202 the comparison circuit produces an output proportional to the difference between its inputs. When the current amplitude signal 201 is less than the delayed amplitude signal then no output is produced. The comparison circuit is connected to a scaling circuit 28. The purpose of the scaling circuit is to modify the output of the comparison circuit. For low levels of input the scaling circuit produces an output within the numerical range zero to one, the output increasing for increasing input. For larger inputs the scaling circuit produces an output numerically equal to one.

The control means can be made to operate when the delay means corresponds to a delay of approximately one television line period or approximately one television field period. The operation will first be described for the case where the delay is approximately one line period.

The input signal 20 is derived from the output of adder 11 in FIG. 5. Because of the choice of the length of the delay means 5 in FIG. 5 chrominance picture information will be in anti-phase at the inputs to adder 11 whereas luminance information will tend to be in phase. Thus chrominance picture information will be substantially cancelled in adder 11 whereas luminance information will add. Where a line-to-line colour change occurs in the picture the chrominance information will not cancel and a signal corresponding to colour subcarrier will occur at the output of adder 11.

Within the control means the amplitude of this signal is measured in peak detecting circuit 21 and is compared with the measurement made on the previous line which is provided from delay means 22. Since luminance information is likely to be similar on successive lines then the comparison circuit will produce little or no output. However when the colour information in the picture changes substantially from one line to the next then a much higher amplitude signal will be measured on one line compared to the previous line. The comparison circuit will then produce a significant output, this output is then modified by the scaling circuit. Typically when the current measured amplitude is slightly greater than the amplitude measured on the previous line then an output between zero and one will be produced at the output of the control means circuit. When the current measured amplitude is significantly greater than the amplitude measured on the previous line then an output of one will be produced.

When such a control means is incorporated into the luminance and chrominance separation circuit shown in FIG. 5 then the output of the control means will reduce the effect of the comb filter when a line-to-line colour change occurs in the picture. This substantially removes undesired subcarrier outputs from the luminance output for stationary pictures.

As discussed in the description of FIG. 2, incomplete separation of luminance and chrominance may also occur when a picture contains moving coloured areas. In this case the incomplete separation of luminance and chrominance will not be corrected by using the control means as described above. This deficiency can be largely overcome by modifying the previously described control means such that the delay means 22 has an effective delay which is an integral number of television lines approximating to one field period. For example a delay of 262 lines is satisfactory for the 525-line NTSC television system and a delay of 313 lines is suitable for the 625-line PAL television system.

The operation of the circuit is identical to the previous description except that the comparison of the current amplitude of apparent high frequency luminance energy is made with respect to a line from the previous field which is also offset vertically because of the interlaced scanning structure of the television system. The result is that a difference output is provided at the output of comparison circuit 23 for cases in which there is either a line-to-line colour change or there is movement of the boundaries of coloured areas of the picture. In either case a control signal will be produced at the output of the control means which will reduce the degree of comb filtering applied in the luminance and chrominance separation circuit of FIG. 5. The use of a delay of approximately one field thus greatly enhances the performance of the arrangement shown in FIG. 5 when the picture contains movement.

Figure 7:
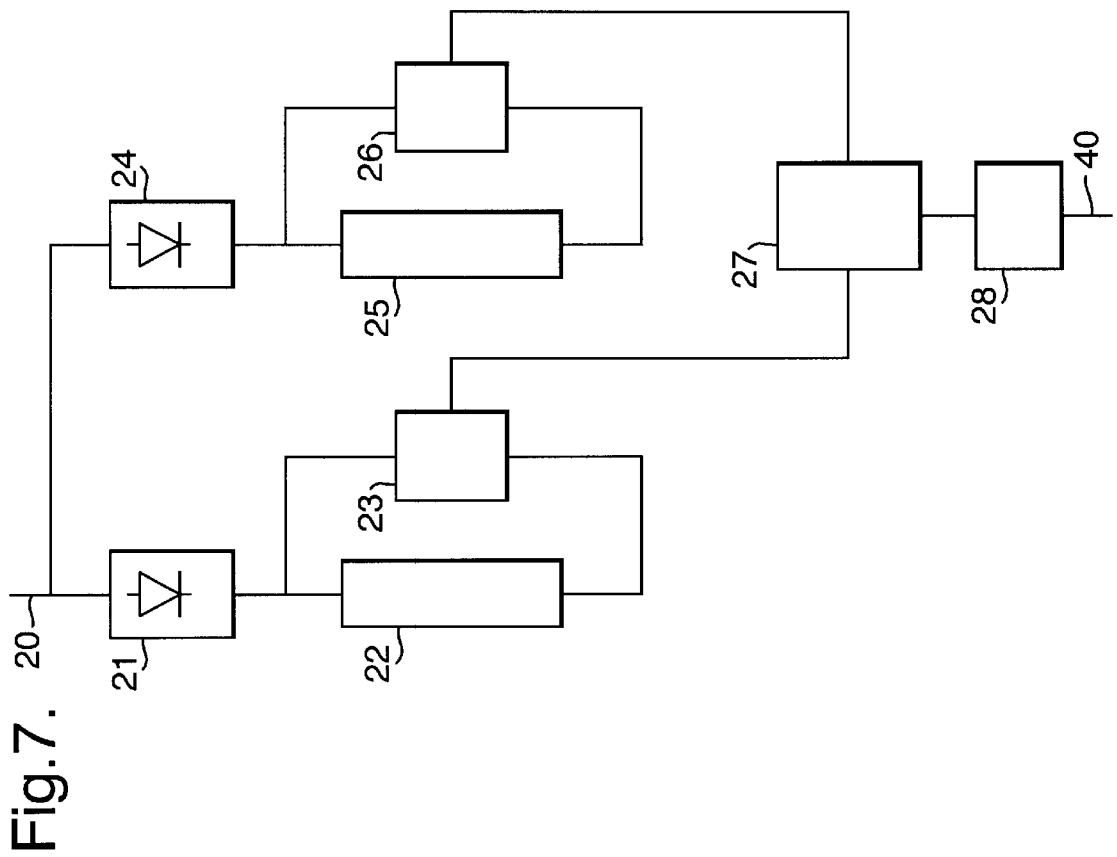
FIG. 7 shows an alternative means of providing a control signal.

A further enhancement of the control means is shown in FIG. 7. The input to the control means is connected to a peak detecting circuit 21, a delay means 22 having a delay equivalent to an integral number of lines approximating to one television field period, and to a comparison circuit 23 as in FIG. 6. The input signal is also connected via a peak detecting circuit 24 to a second delay means 25 which may have a delay approximating to either one line period or one field period. In the latter case the delay of the second delay means 25 would be chosen to be a different integral number of television lines from that of delay means 22. For example for 625-line television signals first delay means 22 could have a delay of 312 lines and second delay means 25 could have a delay of 313 lines. The input and output of the second delay means are connected to a second comparison circuit 26 which is similar to comparison circuit 23.

The outputs of the first and second comparison circuits 23 and 26 are connected to a combining means 27. Such combining means could produce an output corresponding to either the sum of its inputs or the greater of its inputs. The output of the combining means is connected to a scaling circuit 28 as described previously.

The use of this enhancement can improve the separation of luminance and chrominance in pictures which contain fine chrominance vertical detail or vertical motion.

Figure 8:
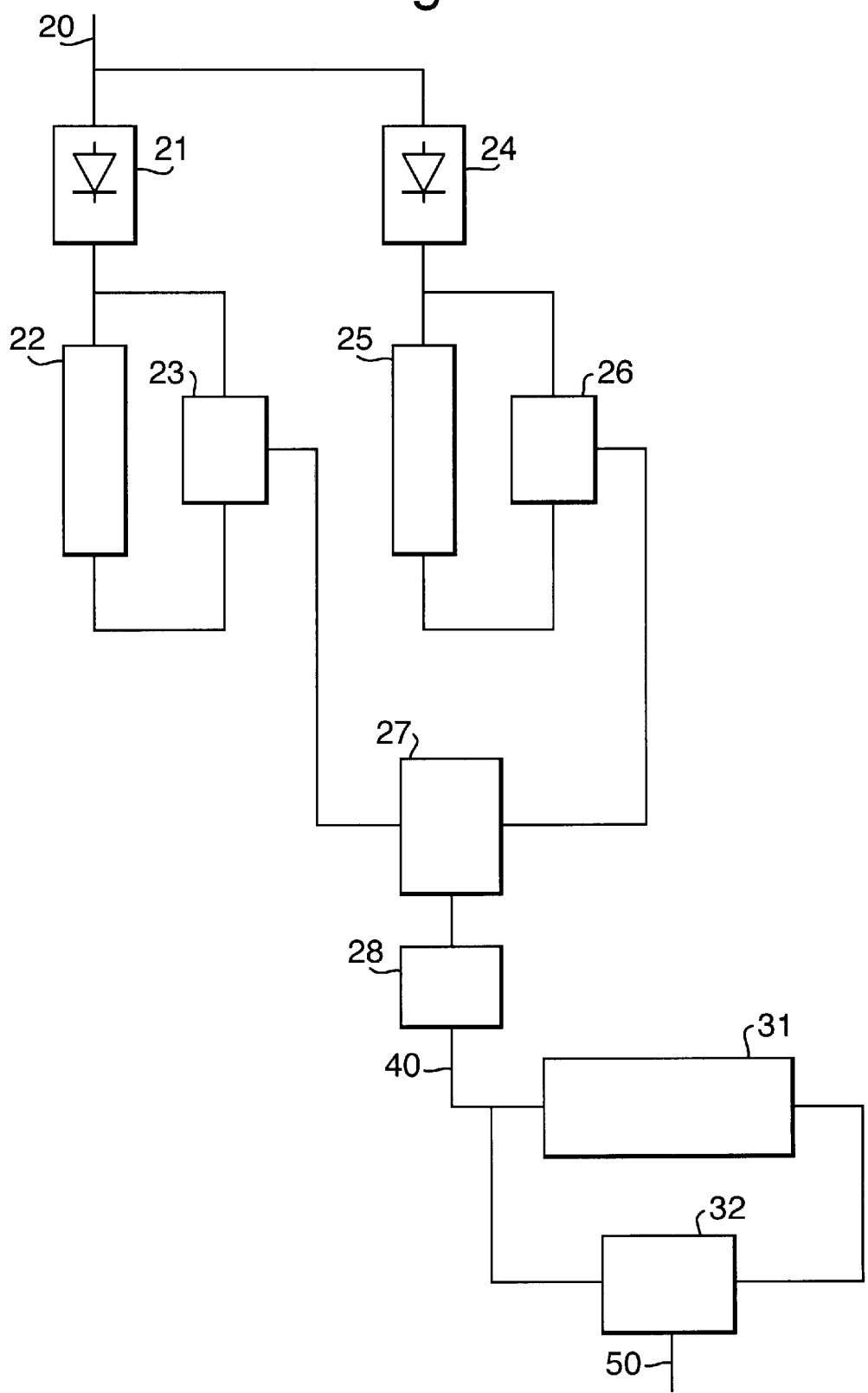
FIG. 8 shows an improved method of providing a control signal.

A further improvement in the control means is shown in FIG. 8. This figure shows an arrangement for the control means similar to FIG. 7 except that the output 40 of scaling circuit 28 is connected to a further combination of third delay means 31 and second combining circuit 32. This extension of the control means may be used in combination with any of the previously described circuits shown in FIGS. 6 and 7.

The additional circuitry operates as follows: the output 40 of the previously described scaling circuit 28 is connected to third delay means 31 which has a delay of an integral number of television lines approximating to one television field period. The output signal from the third delay means and the output signal 40 from scaling circuit 28 are connected to a third combining circuit 32. The third combining circuit selects the greater of its two inputs to be the output signal 50. Alternatively the third combining circuit could add together its two inputs to produce output 50. In the latter case it may be necessary to ensure that the numerical output from the combining circuit does not exceed one. This will ensure correct operation of the control means with the previously described luminance and chrominance separation circuits. The output signal 50 now forms the controlling signal for the luminance and chrominance separation circuits.

The action of the additional circuit is that if a signal 40 is produced from scaling circuit 28 then a controlling signal of at least equal magnitude is produced simultaneously and again on the next field at the output 50.

When used with the previously described luminance and chrominance separation circuits this improves the separation of moving pictures.

The foregoing description has been given by way of example only and it will be appreciated by a person skilled in the art that modifications can be made without departing from the scope of the present invention.

What is claimed is:

1. A video signal decoder including a comb filter characterized by means for changing the operating mode of the filter progressively; the decoder further comprising an input filter and two signal multipliers wherein one of the multipliers is connected to receive a signal output by the input filter and the other multiplier is connected to receive a signal output by the comb filter and wherein operation of the multipliers is mutually interdependent; wherein each multiplier multiplies its input signal by a variable factor, wherein said variable factor for one multiplier is a number between zero and one and wherein said variable factor for the other multiplier is equal to one minus said number.

2. A decoder as claimed in claim 1, wherein the output of each multiplier is input to an adder and an output of the adder provides a chrominance signal.

3. A video signal decoder including a comb filter characterized by means for changing the operating mode of the filter progressively: the decoder further comprising an input filter, a subtraction circuit, and a single multiplier; the multiplier being connected to receive an output from the comb filter and multiply said output by a variable factor so as to input a multiplied signal to said subtraction circuit; the subtraction circuit being connected to perform a subtraction between the multiplied signal and a signal output by the input filter, the subtraction circuit having an output which provides a chrominance signal.

4. A decoder as claimed in claim 3, further comprising control means which outputs a control signal which controls the variable multiplication factor of the multiplier in accordance with a signal output by the comb filter.

5. A decoder as claimed in claim 4, wherein the control means comprises a first input peak detecting circuit, a first comparison circuit connected to receive an output from the first input peak detecting circuit, a first delay means connected to receive an output from the first input peak detecting circuit and to output a signal to the first comparison circuit, and a scaling circuit connected to receive an output from the first comparison circuit and to output said control signal.

6. A decoder as claimed in claim 5, wherein the control means further comprises a second peak detecting circuit, a second comparison means connected to receive an output from the second input peak detecting circuit, a second delay means connected to receive an output from the second input peak detecting circuit and to output a signal to the second comparison circuit, and a first combining means connected to receive respective input signals from the first and second comparison means to output a signal to the scaling circuit.

7. A decoder as claimed in claim 6, wherein the control means further comprises a third delay means and a second combining means, both of the third delay means and the second combining means being connected to receive the signal from the scaling circuit and the secord combining means being connected to receive an output from the third delay means and itself output the said control signal.

8. A decoder as claimed in claim 4, wherein the control means further comprises a second delay means and a first combining means, both of the second delay means and the first combining means being connected to receive the control signal from the control means and the first combining means being connected to receive an output from the second delay means and itself output the said control signal.

9. A decoder as claimed in claim 5, wherein the control means further comprises a second delay means and a first combining means, both of the second delay means and the first combining means being connected to receive the signal from the scaling circuit and the first combining means being connected to receive an output from the second delay means and itself output the said control signal.

10. A decoder as claimed in claim 5, wherein the first delay means provides a delay of one television field period.

11. A video signal decoder including a comb filter characterized by means for adjusting continuously the degree of filtering performed by the filter, the decoder comprising an input filter, a subtraction circuit and a signal multiplier; the multiplier being connected to receive an output from the comb filter and multiply said output by a variable factor so as to input a multiplied signal to said subtraction circuit; the subtraction circuit begin connected to perform a subtraction between the multiplied signal and a signal output by the input filter, the subtraction circuit having an output which provides a chrominance signal.

12. A video signal decoder including a comb filter characterized by means for changing the operating mode of the filter progressively; the decoder further comprising an input filter and two signal multipliers wherein one of the multipliers is connected to receive a signal output by the input filter and the other multiplier is connected to receive a signal output by the comb filter and wherein operation of the multipliers is mutually interdependent; wherein each multiplier multiplies its input signal by a variable factor, wherein said variable factor for one multiplier is a number between zero and one and wherein said variable factor for the other multiplier is equal to one minus said number.

13. A decoder as claimed in claim 12, wherein the output of each multiplier is input to an adder and an output of the adder provides a chrominance signal.

14. A circuit for separating luminance and chrominance signals comprising; an input filter connected to receive an input signal containing the signals to be separated; a signal delay unit connected to receive an output signal from the output filter; a first adder/subtractor unit connected to receive respective output signals from the input filter and the signal delay unit; a first signal multiplier connected to receive an output signal from the first adder/subtractor unit; a second signal multiplier connected to receive an output signal from the first signal multiplier; a third signal multiplier connected to receive the output signal from the input filter; a second adder/subtractor unit connected to receive respective output signals from the second and third signal multipliers; and a third adder/subtractor unit connected to receive the said input signal and an output signal from the second adder/subtractor unit; signal multiplication by the second and third multipliers being mutually interdependent and the chrominance and luminance signals being respectively output by the second and third adder/subtractor units.

* * * * *